United States Patent

[11] 3,586,868

| | | | | |
|---|---|---|---|---|
| [72] | Inventors | David Martens;<br>Henry Epp, both of Winnipeg, Manitoba, Canada | | |
| [21] | Appl. No. | 827,499 | | |
| [22] | Filed | May 26, 1969 | | |
| [45] | Patented | June 22, 1971 | | |
| [73] | Assignee | Genie Power Products Ltd.<br>Winnipeg, Manitoba, Canada | | |

| [54] | ZERO CURRENT TRANSFER DEVICE<br>28 Claims, 4 Drawing Figs. |
|---|---|
| [52] | U.S. Cl.................................................... 307/10,<br>290/1, 317/139 |
| [51] | Int. Cl......................................................... H02g 3/00 |
| [50] | Field of Search.......................................... 307/10, 38,<br>39, 133; 317/139; 290/1, 50 |

[56] References Cited
UNITED STATES PATENTS

| 3,293,443 | 12/1966 | Burch, Jr. | 307/10 X |
|---|---|---|---|
| 3,456,119 | 7/1969 | Schneider | 307/10 X |
| 3,457,491 | 7/1969 | Black et al. | 307/10 X |
| 3,469,073 | 9/1969 | Zechin | 307/10 X |

Primary Examiner—David Smith, Jr.
Attorney—Kent and Ade

ABSTRACT: A circuit for automotive engines and the like having an alternator which can be used to power direct current devices of voltages higher than 12 volts such as 110 volts, directly from the alternator and having circuitry whereby when the load is applied or removed, the transfer of the output of the alternator is made from the battery to the load and vice versa at zero current in order to protect the contact points and for safety.

INVENTOR.
DAVID MARTENS
+
HENRY EPP
BY
Kent + Ade

PATENTED JUN 22 1971

INVENTOR.
DAVID MARTENS
+
BY HENRY EPP

Kent + Ade

ZERO CURRENT TRANSFER DEVICE

This invention relates to new and useful improvements in devices adapted to increase the voltage output from alternators normally incorporated in automotive or truck engines or the like.

These alternators normally supply 12-volt DC current for charging the battery of a car or truck, the 12-volt output being controlled by a conventional regulator which is connected to the field of the alternator.

However, if the regulator is disconnected and a constant current is connected to the field, the output of the regulator insofar as the voltage is concerned, is dependent primarily upon the speed of rotation and the load being drawn.

It is therefore a function of this device to enable electrical devices to be connected which normally operate on a voltage in excess of the conventional 12-volt lighting systems. For example, the device may be designed to provide 110-volt DC current or 220 DC current depending upon the location and the rating of the apparatus designed to be used with the device.

The device fitted to such vehicles as maintenance trucks, farm tractors and cars and the like, which will enable operators to plug in 110- or 220-volt electric drills, lamps, or any other electrical apparatus designed to operate on DC current.

Means are provided to initiate automatic switch over from 12-volt output to 110- or 220-volt output as soon as the load is applied and this is of considerable importance if used with an intermittent device such as an electric drill.

In other words, if an electric drill or the like is plugged into the device, as soon as the switch on the drill is closed, 110 volts or 220 volts is available at the drill. As soon as the drill switch is released, the alternator reverts to 12-volt output thus charging the car or truck battery while the drill is not being used.

The principle object and essence of the device is that means are provided automatically or manually to make the transfer of the output of the alternator from the battery to the load and vice versa at zero current, i.e. with the alternator output at zero, in order to protect the contact points and as a safety feature.

In the remainder of the specification, reference will be made to 110 volts output but, of course, it will be appreciated that the device can be designed to produce any output desired within the design parameters of the alternator. A voltmeter is connected across the load so that when the load is applied and high voltage is being supplied the voltmeter will register this voltage. Furthermore, if a device is connected to the load terminals and this device is shorting, a pilot lamp will immediately illuminate thus adding a safety factor to the operation of the device.

The circuit is fused, in the present instance, with a 10-ampere fuse thus preventing overload from being developed through the alternator. Also this voltmeter is supplied so that the operator may control the engine speed to provide the desired voltage depending upon the load being drawn.

The device is compact, simple in manufacture and operation, and highly suited for use in maintenance work or the like where conventional power is not available.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying Figures in which:

In the drawings like characters of reference indicate corresponding parts in the different figures.

Figure 1:
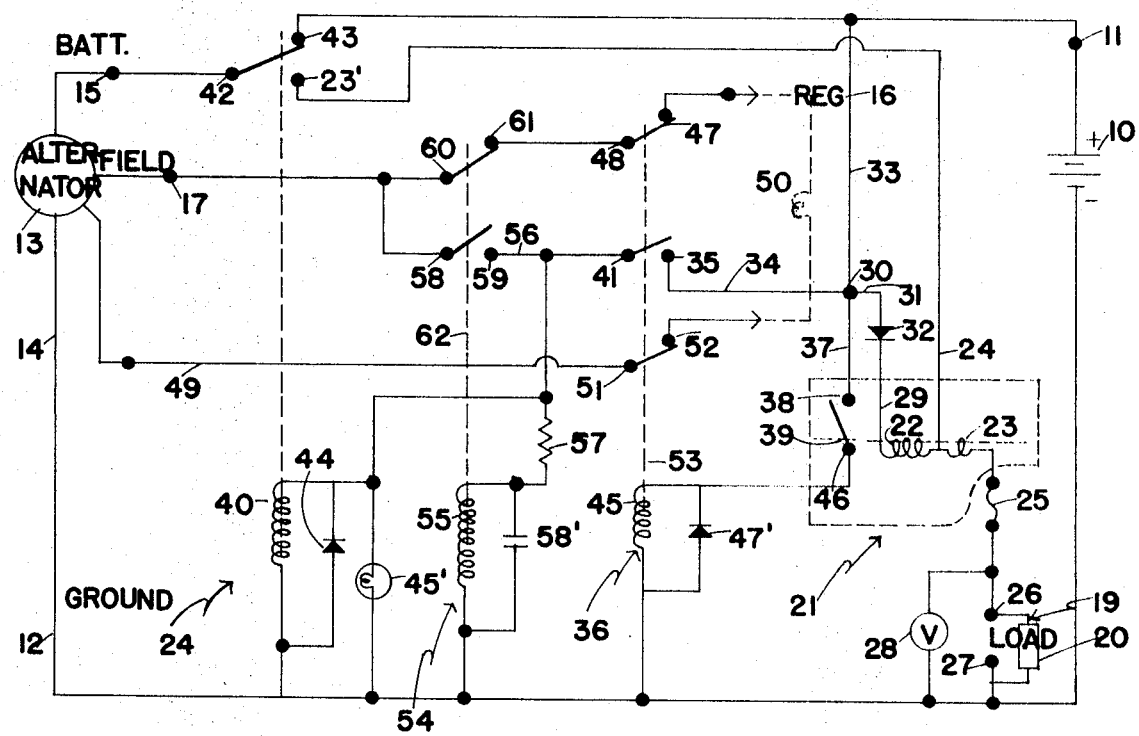
FIG. 1 is a schematic view of the wiring diagram of the device.

Proceeding therefore to describe the invention in detail, it is designed to be used with a conventional alternator, regulator, battery combination of an automotive engine. In the diagram shown in FIG. 1, reference character 10 illustrates a battery with a positive lead or terminal 11 and a negative or ground lead or terminal 12, it being understood of course, that these signs would be reversed if a positive ground system was in use.

The conventional alternator 13 is driven by the engine (not illustrated) and is connected to ground on one side by lead 14 and to the battery through lead and terminal 15 which is connected to terminal 11 of the positive side of the battery as will hereinafter be described.

The output of the alternator is controlled by a conventional regulator 16 which is connected to the field coil of the alternator via terminal 17 in the usual manner. This maintains the alternator output under normal circumstances, to 12 volts regardless of the speed of rotation of the alternator.

Our device which is enclosed within a casing 18 includes a pair of conventional outlets 19 through which a load 20 may be connected. This load may take the form of an electric drill or any DC device designed to operate on a voltage higher than 12 volts. For example, and in the present instance, a voltage of 110 has been chosen.

A sensor relay collectively designated 21 includes an activating coil 22 and a holding coil 23 connected together in series as shown. An electrical conductor 24 extends from the junction between the coils 22 and 23 and extends to a terminal 23' of a relay collectively designated 24' and known as a second relay means as will hereinafter be described.

The end of the holding coil 23 is connected via a fuse 25 to one of the load terminals 26, the other terminal 27 being connected to ground as clearly shown. A voltmeter 28 is also in parallel across the load as shown.

The end 29 of the activator coil 22 is connected to a contact point 30 by means of conductor 31 and a normally forward biassed diode 32 is in series between contact 30 and end 29 as clearly shown.

Contact point 30 is connected via conductor 33 to the positive side 11 of the battery 10. Contact point 30 also connects via conductor 34 to one of the contacts 35 of a relay collectively designated 36 and known as a first relay means as will hereinafter be described. Contact point 30 is also connected via conductor 37 to one of the contact points 38 operated by the sensor relay 21 when the coil 22 is activated. Dotted line 39 in the schematic drawing illustrates this connection.

Referring back to the second relay means 24', the activating coil 40 is in circuit between ground and one of the contacts 41 operated by the first relay means 36 which opens or closes relay contact 41 with contact 35.

When not energized, actuating coil 40 of second relay means 24' normally maintains relay contact point 42 connected to relay point 43 thus connecting the alternator battery output point 15 to the battery positive connection 11.

However, when relay contact 42 is actuated by the coil 40, it connects with relay contact 23' and thence via conductor 24 to the load 20. In this connection there is a suppressor diode 44 across the coil 40. There is also an indicating lamp 45' across this coil 40.

The first relay means 36 includes an actuating or operating coil 45 connected between ground and the relay contact point 46 of the sensor relay 21. A suppressor diode 47' is also provided across this coil. This coil actuates the aforementioned relay contact points 41 and 35 and also relay contact points 47 and 48 which are in the circuit between the field coil 17 of the alternator and the regulator 16.

There is also an electric conductor 49 extending from the alternator to the regulator through an indicating lamp 50. This portion of the circuit is used if an indicating lamp is provided for the regulator rather than a conventional ammeter.

This circuit is opened or closed also by the operating coil 45 of the first relay means through contact relay points 51 and 52. The three sets of points operated by this coil 45 are shown connected by the dotted line 53.

A third relay means collectively designated 54 is also provided and this particular relay means is a time delay relay. It consists of an operating or actuating coil 55 connected between ground and a conductor 56 which forms part of the connection between the field coil 17 of the alternator and the battery connection point 11. A resistance 57 is in circuit with this coil and a condenser 58' across the coil gives a slight delay to the operation thereof. This coil 55 operates two pairs of relay contact points 58 and 59, 60 and 61. 58 and 59 are in circuit between conductor 56 and the field coil 17 of the alternator 16 and the field coil 17 of the alternator. Dotted line 62 indicates the operation of these pairs of contact points by the coil 55.

Summarizing the components, a sensor relay 21 is in circuit between the output of the alternator and the load and first, second and third relay means 36, 24 and 54 are also provided.

In the normal operation of the vehicle, all of the relays are deenergized and the various contact points are at rest in the positions shown in FIG. 1.

Under these circumstances, the current flow is as follows:

The output of the alternator for charging the battery will flow from the output terminal 15 via relay contact points 42 and 43 to the positive terminal 11 of the battery 10. The charging current will be regulated from the vehicle's voltage regulator 16 via the relay contacts 47 and 48, contacts 60 and 61, to the terminal 17 of the field coils of the alternator 13.

When an external load 20 is plugged into the outlet 19, the following sequence of events will take place.

Current will flow from the positive terminal 11 of the battery 10 through conductor 33 to point 30 and thence through conductor 31, through the diode 32 which is normally forward biased, through pickup coil 22 and holding coil 23 of the sensor relay 21, and through the load 20 to ground.

The energizing of the relay coil 22 will close the sensor relay contact points 38 and 46 and will thus energize the relay coil 45 of the first relay means 36 by placing same in circuit between the positive terminal 11 of the battery and ground via conductor 33 and 37.

Once the coil 45 is energized, contacts 47 and 48 will open thus breaking the excitation to the alternator because the regulator 16 is disconnected from the field coil. Under this circumstance there is of course, no output from the alternator.

At the same time the first relay means 36 will actuate the contacts 41 and 35 and close same thus allowing the third relay means 54 to be energized via the positive terminal 11 of the battery 10, conductors 33 and 34, relay contacts 41 and 35, through resistor 57 and coil 55 to ground.

This relay 54, being time delayed due to the condenser 58' being connected across the coil, will pull in with a slight delay.

However, at the same time the second relay means 24 is also energized by means of coil 40 being placed in circuit from positive terminal 11 of the battery 10, conductors 33, 34, contact points 35 and 41 and then through the coil 40 to ground as clearly shown. The energizing of coil 40 operates relay contacts 42 and 43 so that they open and contact 42 then connects with contact 23'. As soon as this occurs, the pilot light 45 will illuminate to indicate this condition and it should be stressed that the switching of the relay points 42, 43 and 23' takes place at zero current as the field of the alternator at this point is not energized. The delay relay is necessary in order to protect the power transfer contacts 42, 43 and 23' from breaking heavy DC currents, as mentioned previously, as the alternator excitation has been broken by contacts 47 and 48, the alternator output is zero and hence a zero current transfer is performed.

The moment the time delay relay 54 actuates, the alternator field will be energized with a full 12 volts from battery 10 from the positive terminal 11, through conductors 33 and 34, relay contacts 35 and 41 and the time delay relay contacts 58 and 59 to the field terminal 17.

The output of the alternator is now transferred from The output 15, through the relay contacts 42 and 23', through conductor 24' to the holding coil 23 of the sensor relay to the load 20 and thence to ground. The output voltage of the alternator is now controlled by the speed of rotation of the alternator only.

The current now flowing through the holding coil 23 will keep the contacts 38 and 46 closed and allow the alternator to supply continuous power to the external load.

During the time the alternator supplies high voltage (80 to 120 volts direct current) to the external load, 20, diode 32 becomes reverse biassed and prevents the output of the alternator being applied to the battery terminal 11.

In vehicles that are equipped with indicating lamp 50 only instead of an ammeter, contacts 51 and 52 of the first relay means 36, which open when the coil 45 is energized, will prevent damage to the lamp 50 from occurring.

As soon as the external load is removed (for example if a drill is being used and the trigger is released) no current flows through holding coil 23 so that contacts 38 and 46 will open. This, of course, deenergizes coil 45 of the first relay means 36 so that contacts 35 and 41 immediately open and again break the excitation to the alternator field 17 so that there is no output from the alternator. Coil 40 is also deenergized at this time so that the contact points 42 and 23' open and points 42 and 43 close at zero current. The condenser 58 also supplies delay to the operation of the third relay means 54 whereupon contacts 47 and 48, which are closed when relay 36 operates, permits the regulator 16 to be connected to the field as soon as the contacts 60 and 61 are actuated by the coil 55 of the time delay relay 54.

Under these circumstances the alternator field is restored to normal operation from the vehicle regulator until once again load 20 is applied.

It will therefore be seen that the load transfer at contact points 42, 43 and 23' takes place up or down at zero current thus protecting these points and also protecting the battery from a high voltage surge.

Figure 2:
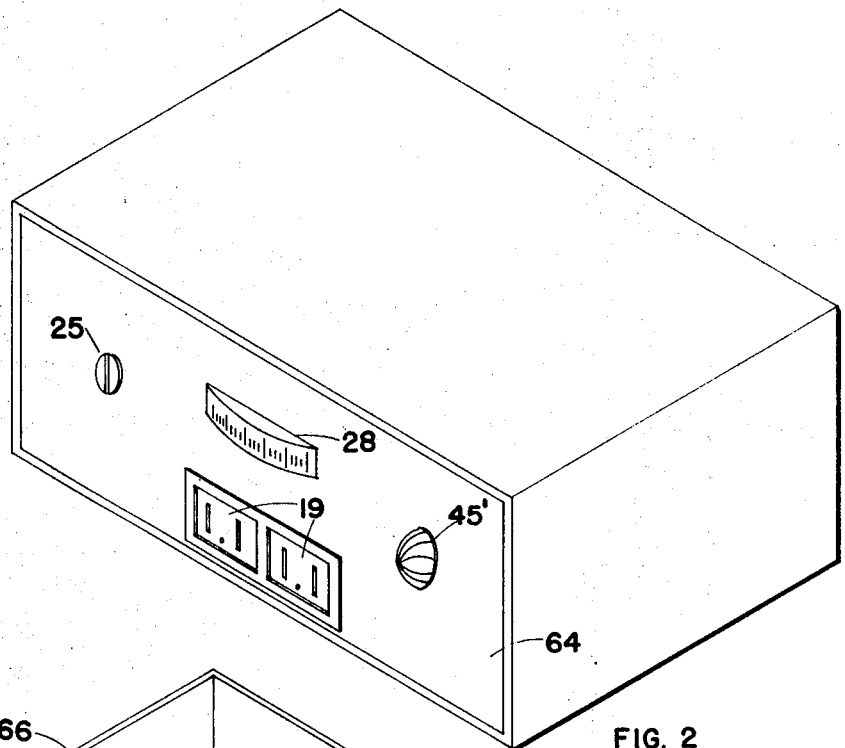
FIG. 2 is an isometric view of the complete device.

The device is housed in the casing 18 as shown in FIG. 2 with the direct current voltmeter 28 displayed on the front panel 64 thereof. Fuse 25 and indicating lamp 45 are also displayed on the front casing and the outlets are indicated by reference characters 19 corresponding to load attachment points 26, 27 as shown in the schematic drawing of FIG. 1.

The necessary leads from the alternator 13 are connected to the rear of the casing (not illustrated).

Figure 3:
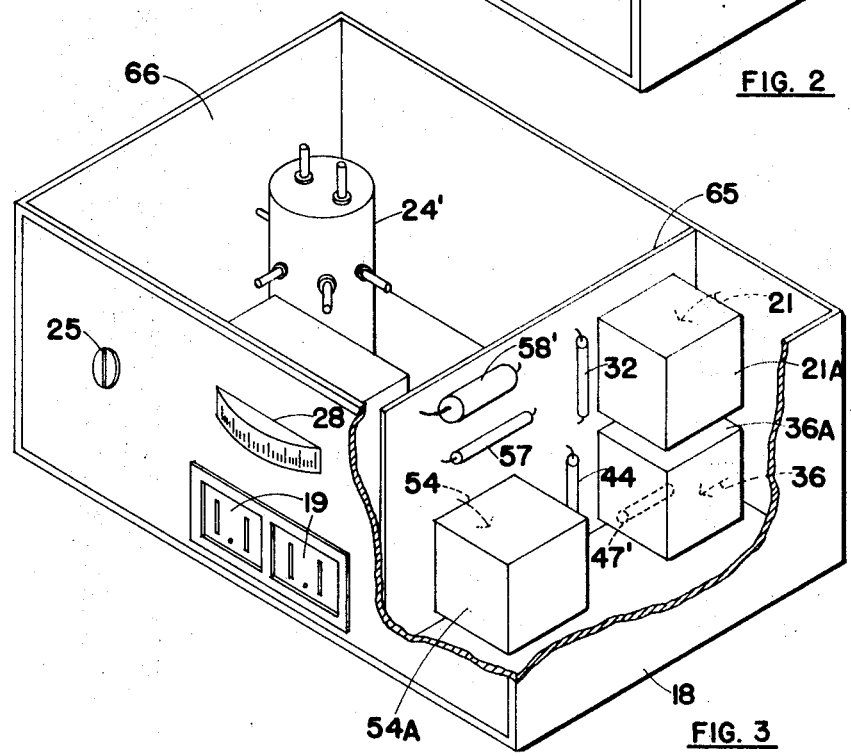
FIG. 3 is an isometric view of the device with the cover removed.

A partition 65 spans the casing and divides it into two portions as shown in FIG. 3. Portion 66 carries the heavy-duty relay 24' and the partition 65 takes the form of a printed circuit board bearing the various components on one face thereof. The relays 21, 36 and 54 are preferably encapsulated into blocks 21A, 36A and 54A respectively and secured to the face of the board. The various other components are secured as indicated making a relatively neat and compact device.

If the load 20 being applied is faulty and is shorting, then current will flow through the circuitry thus illuminating the pilot lamp 45' before the load is switched. This acts as a safety device prior to operating the equipment plugged into the socket 19.

Although the present device is designed primarily for automatic switching, nevertheless it will be appreciated that it is easily modified so that the operation is manual.

Figure 4:
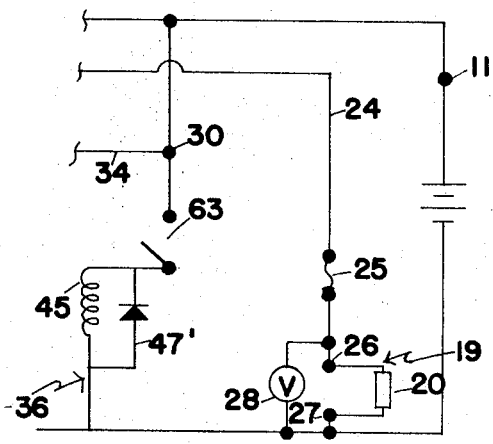
FIG. 4 is a fragmentary schematic view of a portion of the wiring diagram shown in FIG. 1 but including a manually operable switch.

Under these circumstances a manual switch 63 (see FIG. 4) replaces the sensor contacts 38 and 46 and the sensor relay 21 together with the diode 32 is thereby eliminated. The output flow will then follow from the output terminal 15 of the alternator, via relay contacts 42 and 23', conductor 24, through fuse 25 to the load. This still permits zero current transfer to take place up or down.

Various modifications can be made within the scope of the inventive concept which is therein disclosed and/or claimed.

What we claim to be the present invention is:

1. A load-operated voltage-switching device for use with an alternator, battery and regulator combination on automotive engines and the like comprising in combination first relay means operated by the connection or disconnection of said load with said battery, second relay means operated by said first relay means to disconnect or connect the regulator from the field of said alternator whereby the alternator output is reduced to zero, third relay means also operated by said first relay means to switch the output of said alternator from said battery to said load and vice versa, and time delay relay means also operated by said first relay means after said third relay means has operated, to connect or disconnect said battery to the field coil of said alternator.

2. A load-operated voltage-switching device for use with alternator, battery and regulator combinations on automotive engines and the like characterized by the provision of a sensor relay operated by connecting a load between said relay and said battery, first means operated by said sensor relay to break the field coil circuit between the regulator and said alternator thereby reducing the alternator output to zero, second means operated by said sensor relay to change the output current and said alternator from said battery to said load and third means also operated by said sensor relay to connect said battery to said field coil of said alternator.

3. The device according to claim 2 in which said third means includes means for delaying the operation of said third means until after said second means has operated.

4. The device according to claim 2 in which said first means takes the form of a first relay operatively connected to said sensor relay, and contact points operated by said first relay to break the circuit between said alternator field coils and said regulator, said contact points normally being closed when said load is disconnected.

5. The device according to claim 3 in which said first means takes the form of a first relay operatively connected to said sensor relay, and contact points operated by said first relay to break the circuit between said alternator field coils and said regulator, said contact points normally being closed when said load is disconnected.

6. The device according to claim 2 in which said second means takes the form of a second relay operatively connected via said first relay to said sensor relay, and contact points operated by said second relay to switch the output of said alternator from said battery to said load and vice versa.

7. The device according to claim 3 in which said second means takes the form of a second relay operatively connected via said first relay to said sensor relay, and contact points operated by said second relay to switch the output of said alternator from said load and vice versa.

8. The device according to claim 4 in which said second means takes the form of a second relay operatively connected via said first relay to said sensor relay, and contact points operated by said second relay to switch the output of said alternator from said battery to said load and vice versa.

9. The device according to claim 5 in which said second means takes the form of a second relay operatively connected via said first relay to said sensor relay, and contact points operated by said second relay to switch the output of said alternator from said battery to said load and vice versa.

10. The device according to claim 3 in which said third means comprises a third relay operatively connected to said sensor relay via said first relay, a condenser across the coil of said third relay to delay the energizing thereof, contact points operated by said third relay of disconnect the regulator from the field coil of the alternator and to connect the battery to said field coil after said second relay has been energized, said sensor relay including a holding coil in series between said alternator output and said load to hold said sensor relay and hence said first, second and third relay in circuit while said load is connected.

11. The device according to claim 4 in which said third means comprises a third relay operatively connected to said sensor relay via said first relay, a condenser across the coil of said third relay to delay the energizing thereof, contact points operated by said third relay to disconnect the regulator from the field coil of the alternator and to connect the battery to said field coil after said second relay has been energized, said sensor relay including a holding coil in series between said alternator output and said load to hold said sensor relay and hence said first, second and third relay in circuit while said load is connected.

12. The device according to claim 5 in which said third means comprises a third relay operatively connected to said sensor relay via said first relay, a condenser across the coil of said third relay to delay the energizing thereof, contact points operated by said third relay to disconnect the regulator from the field coil of the alternator and to connect the battery to said field coil after said second relay has been energized, said sensor relay including a holding coil in series between said alternator output and said load to hold said sensor relay and hence said first, second and third relay in circuit while said load is connected.

13. The device according to claim 6 in which said third means comprises a third relay operatively connected to said sensor relay via said first relay, a condenser across the coil of said third relay to delay the energizing thereof, contact points operated by said third relay to disconnect the regulator from the field coil of the alternator and to connect the battery to said field coil after said second relay has been energized, said sensor relay including a holding coil in series between said alternator output and said load to hold said sensor relay and hence said first, second and third relay in circuit while said load is connected.

14. The device according to claim 7 in which said third means comprises a third relay operatively connected to said sensor relay via said first relay, a condenser across the coil of said third relay to delay the energizing thereof, contact points operated by said third relay to disconnect the regulator from the field coil of the alternator and to connect the battery to said field coil after said second relay has been energized, said sensor relay including a holding coil in series between said alternator output and said load to hold said sensor relay and hence said first, second and third relay in circuit while said load is connected.

15. The device a according to claim 8 in which said third means comprises a third relay operatively connected to said sensor relay via said first relay, a condenser across the coil of said third relay to delay the energizing thereof, contact points operated by said third relay to disconnect the regulator from the field coil of the alternator and to connect the battery to said field coil after said second relay has been energized, said sensor relay including a holding coil in series between said alternator output and said load to hold said sensor relay and hence said first, second and third relay in circuit while said load is connected.

16. The device according to claim 9 in which said third means comprises a third relay operatively connected to said sensor relay via said first relay, a condenser across the coil of said third relay to delay the energizing thereof, contact points operated by said third relay to disconnect the regulator from the field coil of the alternator and to connect the battery to said field coil after said second relay has been energized, said sensor relay including a holding coil in series between said alternator output and said load to hold said sensor relay and hence said first, second and third relay in circuit while said load is connected.

17. The device according to claim 10 which includes reversibly biassed diode means between said battery and said sensor coil to prevent the output of said alternator when said load is connected, from passing to said battery.

18. The device according to claim 11 which includes reversibly biassed diode means between said battery and said sensor coil to prevent the output of said alternator when said load is connected, from passing to said battery.

19. The device according to claim 12 which includes reversibly biassed diode means between said battery and said sensor coil to prevent the output of said alternator when said load is connected, from passing to said battery.

20. The device according to claim 13 which includes reversibly biassed diode means between said battery and said sensor coil to prevent the output of said alternator when said load is connected, from passing to said battery.

21. The device according to claim 14 which includes reversibly biassed diode means between said battery and said sensor coil to prevent the output of said alternator when said load is connected, from passing to said battery.

22. The device according to claim 15 which includes reversibly biassed diode means between said battery and said sensor coil to prevent the output of said when said load is connected, from passing to said battery.

23. The device according to claim 16 which includes reversibly biassed diode means between said battery and said sensor coil to prevent the output of said alternator when said load is connected, from passing to said battery.

24. A zero current transfer device for use with alternator, battery and regulator combination used in automotive engines and the like, comprising in combination of plurality of electric relays and means to operate said relays sequentially when a load is connected of disconnected to said device whereby the switching of the alternator current from the battery to the load and vice versa takes place at zero current.

25. The device according to claim 24 in which said means includes a sensor relay operated by the connection of said load between said relay and said battery, first means operated by said sensor relay to break the field coil circuit between said regulator and said alternator thereby reducing the alternator output to zero, second means operated by said sensor relay to change the output circuit of said alternator from said battery to said load and third means also operated by said sensor relay to connect said battery to said field coil of said alternator.

26. The device according to claim 25 in which said third means includes means for delaying the operation of said third means until after said second means has operated.

27. The device according to claim 25 in which said first means takes the form of a first relay operatively connected to said sensor relay, and contact points operated by said first relay to break the circuit between said alternator field coils and said regulator, said contact points normally being closed when said load is discontinued.

28. The device according to claim 26 in which said first means takes the form of a first relay operatively connected to said sensor relay, and contact points operated by said first relay to break the circuit between said alternator field coils and said regulator, said contacts points normally being closed when said load is disconnected.